(12) United States Patent
Wang et al.

(10) Patent No.: US 11,157,181 B2
(45) Date of Patent: Oct. 26, 2021

(54) CARD ACTIVATION DEVICE AND METHODS FOR AUTHENTICATING AND ACTIVATING A DATA STORAGE DEVICE BY USING A CARD ACTIVATION DEVICE

(71) Applicant: Silicon Motion, Inc., Jhubei (TW)

(72) Inventors: Te-Kai Wang, New Taipei (TW); Hsing-Lang Huang, Tainan (TW)

(73) Assignee: Silicon Motion, Inc., Hsinchu County (TW)

(*) Notice: Subject to any disclaimer, the term of this patent is extended or adjusted under 35 U.S.C. 154(b) by 177 days.

(21) Appl. No.: 16/505,159

(22) Filed: Jul. 8, 2019

(65) Prior Publication Data

US 2020/0019324 A1 Jan. 16, 2020

Related U.S. Application Data

(60) Provisional application No. 62/696,885, filed on Jul. 12, 2018.

(30) Foreign Application Priority Data

Nov. 16, 2018 (TW) .................................. 107140756

(51) Int. Cl.
*G06F 3/06* (2006.01)
*G06F 21/34* (2013.01)
*H04L 9/08* (2006.01)

(52) U.S. Cl.
CPC .......... *G06F 3/0622* (2013.01); *G06F 3/0655* (2013.01); *G06F 3/0679* (2013.01); *G06F 21/34* (2013.01); *H04L 9/088* (2013.01)

(58) Field of Classification Search
None
See application file for complete search history.

(56) References Cited

U.S. PATENT DOCUMENTS 7,260,726 B1 * 8/2007 Doe ........................ G06F 21/34
380/228
8,826,377 B2 * 9/2014 Lou ........................ G06F 21/31
726/3

(Continued)

FOREIGN PATENT DOCUMENTS

| CN | 105339919 A | 2/2016 |
|----|-------------|--------|
| CN | 105631496 A | 6/2016 |
| CN | 107862514 A | 3/2018 |

*Primary Examiner* — Elias Mamo
(74) *Attorney, Agent, or Firm* — Winston Hsu

(57) ABSTRACT

A card activation device includes a first control unit and a central control unit. In response to a first control command, the central control unit provides first authentication data to the first control unit and the first control unit transmits the first authentication data to the data storage device. After the first authentication data is transmitted to the data storage device, the central control unit provides second authentication data to the first control unit and the first control unit transmits the second authentication data to the data storage device. After the second authentication data is transmitted to the data storage device, the card activation device enters a fully locked state and performs an authentication procedure for authenticating the data storage device. Before the data storage device has passed the authentication procedure, the central control unit is not allowed to transmit any data to the data storage device.

15 Claims, 7 Drawing Sheets

(56) References Cited

U.S. PATENT DOCUMENTS

| | | | |
|---|---|---|---|
| 9,831,006 B2 * | 11/2017 | Minor | G21F 5/08 |
| 9,984,007 B2 | 5/2018 | Lee | |
| 2004/0006713 A1 * | 1/2004 | Minemura | H04L 63/061 |
| | | | 726/29 |
| 2006/0143600 A1 * | 6/2006 | Cottrell | G06F 21/572 |
| | | | 717/168 |
| 2011/0291834 A1 | 12/2011 | Boldyrev | |
| 2015/0339664 A1 | 11/2015 | Wong | |
| 2017/0171209 A1 * | 6/2017 | Licklider | G06F 21/6218 |
| 2017/0288867 A1 * | 10/2017 | Collier | G06F 21/31 |

* cited by examiner

CARD ACTIVATION DEVICE AND METHODS FOR AUTHENTICATING AND ACTIVATING A DATA STORAGE DEVICE BY USING A CARD ACTIVATION DEVICE

CROSS REFERENCE TO RELATED APPLICATIONS

This application claims the benefit of U.S. Provisional Application No. 62/696,885 filed 2018 Jul. 12 and entitled "Apparatus and methods for authenticating a data storage device", the entire contents of which are hereby incorporated by reference.

This application also claims priority of Taiwan Patent Application No. 107140756, filed 2018 Nov. 16, the entirety of which is incorporated by reference herein.

BACKGROUND OF THE INVENTION

Field of the Invention

The invention relates to a card activation device and a method for activating a data storage device, and more particularly to a card activation device and methods for authenticating and activating a data storage device by using a card activation device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

Generally, the device firmware for activating the data storage device is downloaded to the data storage device in the mass production stage. The device firmware is usually customized and designed to meet the customer's requirements. Therefore, the device firmware is usually not written to the internal memory of the data storage device in advance before packaging the corresponding memory chip, and will be loaded in the mass production stage of the data storage device. In order to load the device firmware more efficiently and securely, a novel card activation device and a novel method for activating a data storage device are required.

BRIEF SUMMARY OF THE INVENTION

Card activation devices and methods for authenticating and activating a data storage device by using a card activation device are provided. An exemplary embodiment of a card activation device comprises a first control unit and a central control unit.

A card activation device for authenticating and activating a data storage device comprises a first control unit and a central control unit. The first control unit is coupled to the data storage device through a first interface. The central control unit is coupled to the first control unit through a system bus. In response to a first control command received from an electronic device, the central control unit is configured to provide first authentication data to the first control unit through the system bus, and the first control unit is configured to transmit the first authentication data to the data storage device through the first interface. After the first authentication data is transmitted to the data storage device, the central control unit is configured to provide second authentication data to the first control unit through the system bus in response to a second control command received from the electronic device, and the first control unit is configured to transmit the second authentication data to the data storage device through the first interface. After the second authentication data is transmitted to the data storage device, the central control unit controls the card activation device to enter a fully locked state, in the fully locked state, the central control unit is configured to perform an authentication procedure for authenticating the data storage device, and before the central control unit determines that the data storage device has passed the authentication procedure, the central control unit is not allowed to transmit any data to the data storage device.

An exemplary embodiment of a method of using a card activation device to authenticate and activate a data storage device comprises: the card activation device transmitting first authentication data to the data storage device in response to a first control command received from an electronic device; after the first authentication data is transmitted to the data storage device, the card activation device transmitting second authentication data to the data storage device in response to a second control command received from the electronic device; after the second authentication data is transmitted to the data storage device, controlling the card activation device to enter a fully locked state, wherein in the fully locked state and before the card activation device determines that the data storage device has passed an authentication procedure, no data transfer between the card activation device and the data storage device is allowed; the card activation device performing the authentication procedure for authenticating the data storage device and determining whether the data storage device has passed the authentication procedure; controlling the card activation device to enter an unlocked state when determining that the data storage device has passed the authentication procedure; and in the unlocked state, by the card activation device receiving a third control command and device firmware of the data storage device from the electronic device, and transmitting the device firmware to the data storage device in response to the third control command, so as to activate the data storage device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is the contemplated mode of carrying out the invention. This description is made for the purpose of illustrating the general principles of the invention and should not be taken in a limiting sense. The scope of the invention is best determined by reference to the appended claims. It should be understood that the following embodiments may be implemented by software, hardware, firmware, or any combination of the above.

Figure 1:
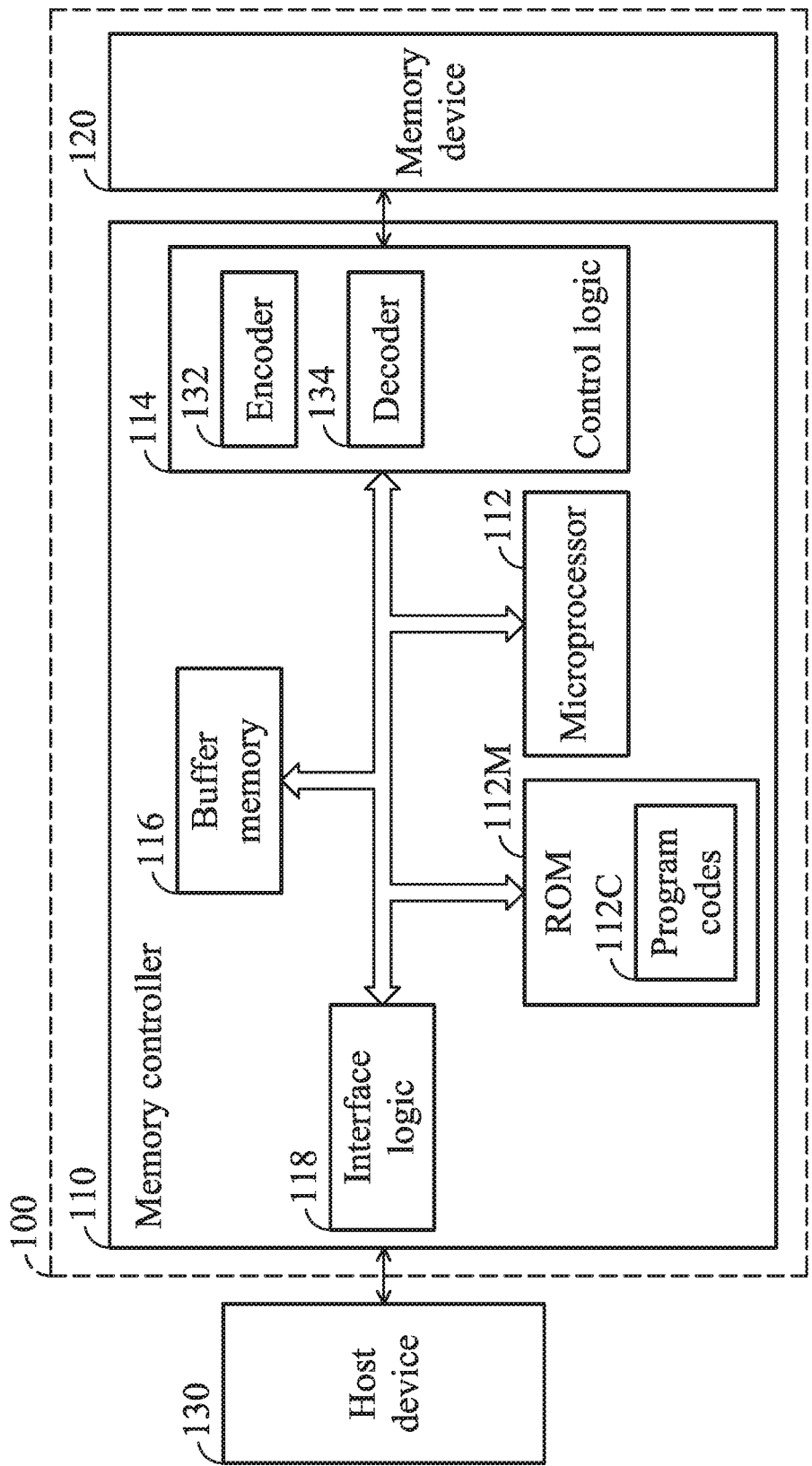
FIG. 1 shows an exemplary block diagram of a data storage device according to an embodiment of the invention.

FIG. 1 shows an exemplary block diagram of a data storage device 100 according to an embodiment of the invention. The data storage device 100 may comprise a memory device 120, such as a NAND flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

Generally, the host device 130 may issue commands, such as the read command or the write command, to the data storage device 100, so as to access the data stored in the memory device 120, or the host device 130 may issue commands to further control or manage the data storage device 100. In an embodiment of the invention, the data storage device 100 may be configured in a digital camera, a mobile phone, a consumer electronic device, or others. In an embodiment, the data storage device 100 may be a portable storage device (for example, the memory card in compliance with the SD/MMC, CF, MS and/or XD standard), and the host device 130 may be an electronic device capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device. In such an embodiment, the host device 130 may be a processor of the electronic device or another electronic device connecting to the data storage device 100. The UFS and eMMC are common flash storage specifications to bring higher data transfer speed and increased reliability to flash memory storage.

As discussed above, the device firmware has to be downloaded to the data storage device 100 in the mass production stage of the data storage device 100, so as to activate the data storage device 100. Generally, loading the device firmware may be implemented by the host device 130 connecting to the data storage device 100. At this time, the host device 130 connecting to the data storage device 100 may be a card activation device or a card reader.

Figure 2:
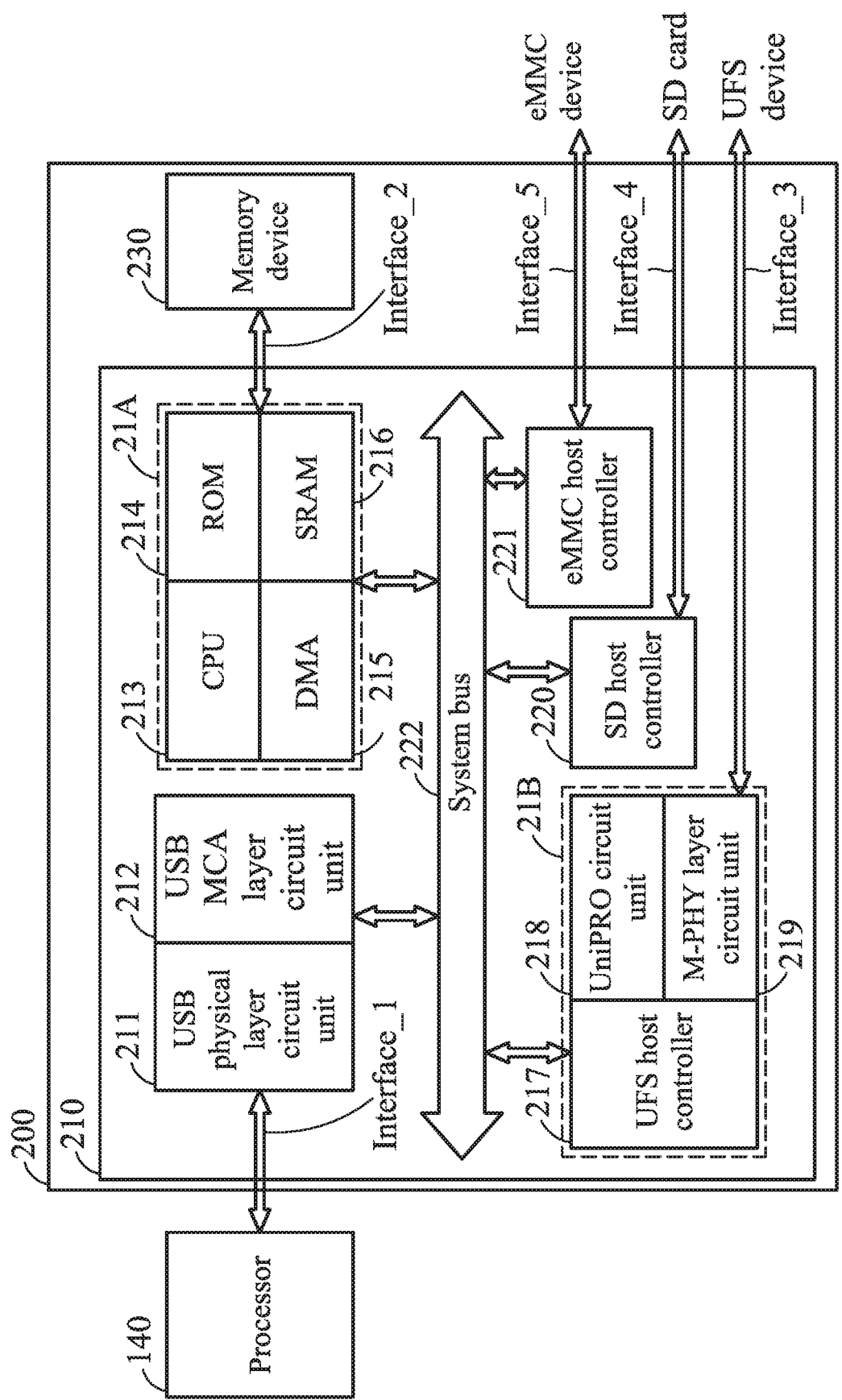
FIG. 2 is an exemplary block diagram of a card activation device according to an embodiment of the invention.

FIG. 2 is an exemplary block diagram of a card activation device according to an embodiment of the invention. In the embodiment of the invention, the card activation device 200 may be the host device 130 which connecting to the data storage device 100 as shown in FIG. 1 through a predetermined interface for authenticating the data storage device 100. When the host device 130 determines that the data storage device 100 has passed the authentication, the host device 130 is configured to load the device firmware which is required by the data storage device 100 to the data storage device 100.

According to an embodiment of the invention, the card activation device 200 may comprise a main section 210 and an external memory device 230. The external memory device 230 is disposed external to the main section 210. According to an embodiment of the invention, the card activation device 200 may comprise a first interface Interface_1. The card activation device 200 may communicate with the processor 140 through the first interface Interface_1 and using a standard protocol, such as USB (Universal Serial Bus), ATA (Advanced Technology Attachment), SATA (Serial ATA), PCI-E (Peripheral Component Interconnect Express) or others. According to an embodiment of the invention, the card activation device 200 may comprise a USB physical layer circuit unit 211 and a USB Media Access Control (MAC) layer circuit unit 212 which are configured to perform data processing in different layers in compliance with the corresponding USB protocols.

The card activation device 200 may further comprise a central control unit 21A. The central control unit 21A may comprise a Central Processing Unit (CPU) 213, a Read Only Memory (ROM) 214, a Direct Memory Access (DMA) device 215 and a Static Random Access Memory (SRAM) 216. According to an embodiment of the invention, the card activation device 200 may further comprise a second interface Interface_2. The card activation device 200 may communicate with the memory device 230 through the second interface Interface_2 and using a standard protocol, such as an Inter-Integrated Circuit Bus (I2C), a Serial Peripheral Interface (SPI), or others. The ROM 214 may be configured to store the boot code and the memory device 230 may be configured to store the In-system programming (ISP) code or the In-circuit programming (ICP) code.

When the card activation device 200 is powered up, the CPU 213 may execute the boot code stored in the ROM 214, for initializing the card activation device 200. The CPU 213 may further read the ISP code from the memory device 230 and load the ISP code into the SRAM 216. The CPU 213 may then execute the ISP code and provide predetermined functions according to the content compiled by the ISP code. The central control unit 21A may communicate with the UFS control unit 21B, the SD control unit and the eMMC control unit through the system bus 222. The UFS control unit 21B may communicate with an external UFS device through the third interface Interface_3, where the third interface Interface_3 may be the UFS interface. The SD control unit may communicate with an external SD card through the fourth interface Interface_4, where the fourth interface Interface_4 may be the SD interface. The eMMC control unit may communicate with an external eMMC device through the fifth interface Interface_5, where the fifth interface Interface_5 may be the eMMC interface.

The UFS control unit 21B may comprise a UFS host controller 217, a Mobile Industry Processor Interface (MIPI) unified protocol UniPRO circuit unit 218 and an MIPI physical (M-PHY) layer circuit unit 219. The UFS host controller 217 may receive commends, such as the Read/Write command, and data from the CPU 213 via the system bus 222, and may be configured to convert the received commands and data into a predetermined format in compliance with the UFS protocol. The UniPRO circuit unit 218 and the M-PHY layer circuit unit 219 are configured to perform data processing in different layers (for example, the data link layer and the physical layer) based on the corresponding UFS protocols. After being converted and processed, the commands and data are transmitted to the external UFS device via the third interface Interface_3.

The SD control unit may comprise an SD host controller 220. The SD host controller 220 may receive commends, such as the Read/Write command, and data from the CPU 213 via the system bus 222, and may be configured to convert the received commands and data into a predetermined format in compliance with the SD protocol. After being converted and processed, the commands and data are transmitted to the external SD card via the fourth interface Interface_4. The eMMC control unit may comprise an eMMC host controller 221. The eMMC host controller 221 may receive commends, such as the Read/Write command, and data from the CPU 213 via the system bus 222, and may be configured to convert the received commands and data into a predetermined format in compliance with the eMMC protocol. After being converted and processed, the commands and data are transmitted to the external eMMC device via the fifth interface Interface_5.

Figure 3:
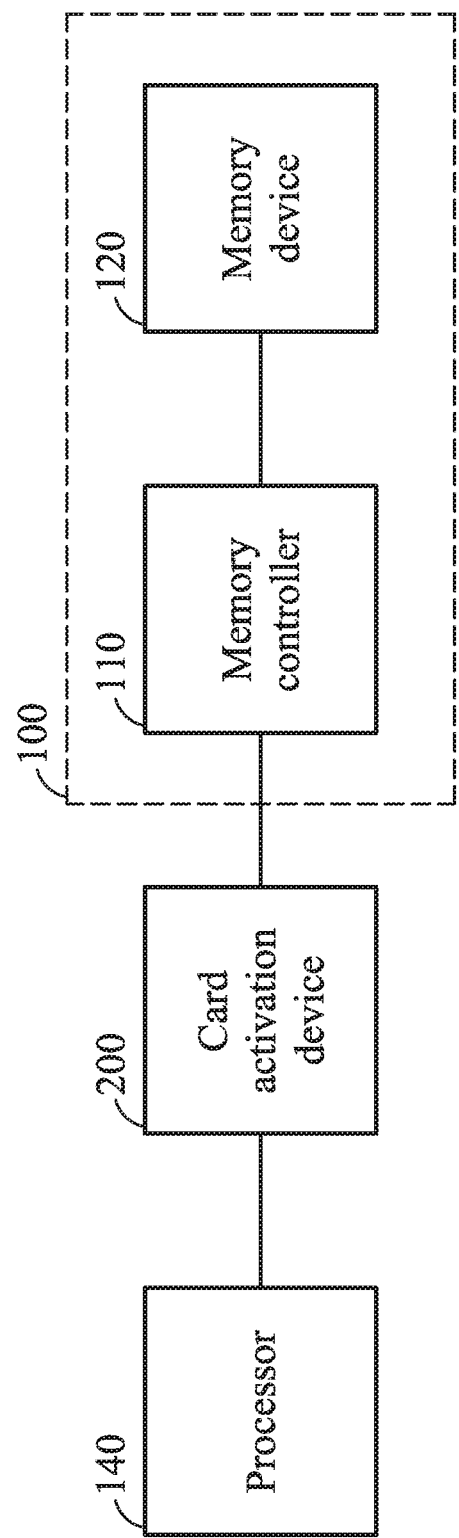
FIG. 3 is an exemplary architecture of an electronic equipment system according to an embodiment of the invention.

FIG. 3 is an exemplary architecture of an electronic equipment system according to an embodiment of the invention. The electronic equipment system may comprise a data storage device 100, a card activation device 200 and a processor 140. The data storage device 100 may comprise a memory controller 110 and a memory device 120. According to an embodiment of the invention, the card activation device 200 and the data storage device 100 may communicate with each other through the predetermined interface as discussed above. The predetermined interface may be a flash memory interface, for example, a UFS interface or an eMMC interface. At this time, the data storage device 100 may be the UFS device or the eMMC device.

According to an embodiment of the invention, the card activation device 200 (or the above-mentioned host device 130) may be a hardware device configured to activate the data storage device 100 at the host side. As an example, as discussed above, the card activation device 200 may be utilized to authenticate and then activate the data storage device 100 in a mass production stage of the data storage device. The activation procedure may also be called as a card-activation procedure for loading the corresponding device firmware to the data storage device 100 and activating the data storage device 100. The card activation device 200 may communicate with the processor 140 through an access interface and using a standard protocol as discussed above. The processor 140 may be the processor of another electronic device, such as a computer device. According to an embodiment of the invention, the processor 140 may issue commands to control the activation procedure. According to an embodiment of the invention, in response to commands received from the processor 140, the card activation device 200 may transmit corresponding commands (e.g. the UFC or eMMC commands) and data to the memory controller 110 and receive data and messages from the memory controller 110.

Referring back to FIG. 2, according to an embodiment of the invention, after the card activation device 200 is powered up, a first locked state of the card activation device 200 is entered under the control of the central control unit 21A (for example, under the control of the CPU 213 of the central control unit 21A). In the first locked state, the central control unit 21A (or, the corresponding the card activation device 200) is allowed to perform data transfer for transmitting data to the data storage device 100 a first predetermined number of times at most. In addition, in the first locked state, the amount of data that can be transferred to the data storage device 100 is also limited to a predetermined amount.

The central control unit 21A may receive a first control command and first authentication data from the processor 140 (or, from the corresponding electronic device comprising the processor 140, which is also applied hereinafter). The first control command is used to instruct the card activation device 200 to transmit the first authentication data to the data storage device 100.

In response to the first control command, the central control unit 21A is configured to provide the first authentication data to another control unit, such as the UFS control unit 21B, via the system bus 222. After performing some corresponding data processing as discussed above, the control unit, such as the UFS control unit 21B, is configured to transmit the first authentication data to the data storage device 100 via the corresponding interface Interface_3. In this embodiment, the data storage device 100 is a UFS device.

According to an embodiment of the invention, the first authentication data may comprise the program code Tiny_code which is utilized to generate encrypted data. The program code Tiny_code is small data, which facilitates the data storage device 100 to generate corresponding authentication response data for responding to the card activation device 200 in the authentication procedure.

According to an embodiment of the invention, after the first authentication data is transmitted to the data storage device 100, a second locked state of the card activation device 200 is entered under the control of the central control unit 21A. In the second locked state, the central control unit 21A (or, the corresponding the card activation device 200) is allowed to perform data transfer for transmitting data to the data storage device 100 a second predetermined number of times at most. In addition, in the second locked state, the amount of data that can be transferred to the data storage device 100 is also limited to a predetermined amount.

After the first authentication data is transmitted to the data storage device 100, the central control unit 21A may receive a second control command from the processor 140. The second control command is used to instruct the card activation device 200 to transmit second authentication data to the data storage device 100. In the embodiments of the invention, the second authentication data may be provided by the processor 140 or may be generated by the card activation device (which will be discussed in more detailed in different embodiments in the following paragraphs).

In response to the second control command, the central control unit 21A is configured to provide the second authentication data to the corresponding control unit, such as the UFS control unit 21B, via the system bus 222. After performing some corresponding data processing as discussed above, the control unit, such as the UFS control unit 21B, is configured to transmit the second authentication data to the data storage device 100 via the corresponding interface Interface_3.

After the second authentication data is transmitted to the data storage device, the card activation device 200 is configured to wait for the data storage device 100 to reply corresponding authentication response data. Upon receiving the authentication response data, the central control unit 21A is configured to perform an authentication procedure of the data storage device 100 according to the authentication response data. According to an embodiment of the invention, after transmission of the second authentication data is finished, a fully locked state of the card activation device 200 is entered under the control of the central control unit 21A. In the fully locked state, before the central control unit 21A determines that the data storage device 100 has passed the authentication procedure, the central control unit 21A is not allowed to transmit any data to the data storage device 100.

After determining that the data storage device 100 has passed the authentication procedure, an unlocked state of the card activation device 200 is entered under the control of the central control unit 21A. In the unlocked state, the central control unit 21A receives a third control command and device firmware of the data storage device 100 from the processor 140. In response to the third control command, the central control unit 21A is configured to provide the device firmware to the corresponding control unit, such as the UFS control unit 21B, through the system bus 222. After performing some corresponding data processing as discussed above, the corresponding control unit, such as the UFS control unit 21B, is configured to transmit the device firmware to the data storage device 100 via the corresponding interface Interface_3, so as to activate the data storage device 100.

Figure 4:
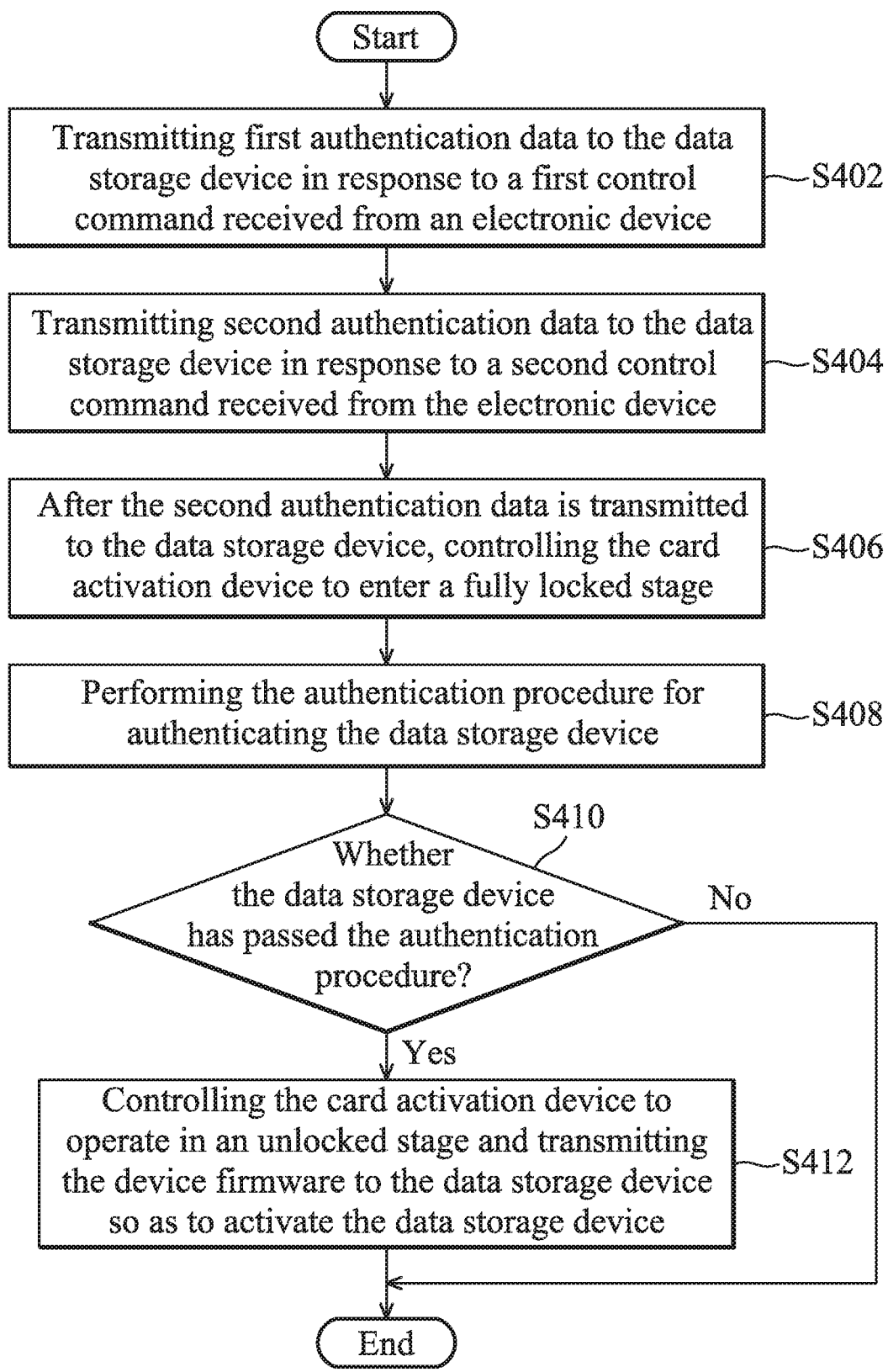
FIG. 4 is an exemplary flow chart of a method of using a card activation device to authenticate and activate a data storage device according to an embodiment of the invention.

FIG. 4 is an exemplary flow chart of a method of using a card activation device to authenticate and activate a data storage device according to an embodiment of the invention. It should be noted that in the embodiments of the invention, the card activation device may also be referred to as a host device, such as the host device 130 shown in FIG. 1. First of all, the card activation device may transmit first authentication data to the data storage device in response to a first control command received from an electronic device (Step S402). Next, after the first authentication data is transmitted to the data storage device, the card activation device may transmit second authentication data to the data storage device in response to a second control command received from the electronic device (Step S404). Next, after the second authentication data is transmitted to the data storage device, the card activation device enters a fully locked state (Step S406) and the card activation device may perform the authentication procedure of the data storage device (Step S408). Next, the card activation device may determine whether the data storage device has passed the authentication procedure (Step S410). If so, the card activation device enters an unlocked state to receive a third control command and device firmware of the data storage device from the electronic device and transmit the device firmware to the data storage device in response to the third control command, so as to activate the data storage device (Step S412). If not, the card activation device is kept locked and operates in the fully locked state. Since it is in the fully locked state and before the card activation device determines that the data storage device has passed the authentication procedure, no data transfer between the card activation device and the data storage device is allowed. Therefore, before determining that the data storage device has passed the authentication procedure, the card activation device will not transmit the device firmware to the data storage device. In other words, the data storage device which is unable to pass the authentication procedure will not be activated.

According to a first embodiment of the invention, the second authentication data comprises a key and an encryption method selected by the processor 140 (or the corresponding electronic device comprising the processor 140, which is also applied hereinafter). The central control unit 21A (or the corresponding card activation device 200, which is also applied hereinafter) may receive the second authentication data from the processor 140. During the authentication procedure, the central control unit 21A may use the received key and the encryption method to calculate a first encrypted key, compare whether the first encrypted key and a second encrypted key (that is, the above-mentioned authentication response data) received from the data storage device 100 are identical, and determine that the data storage device has passed the authentication procedure when the first encrypted key and the second encrypted key are identical.

Figure 5:
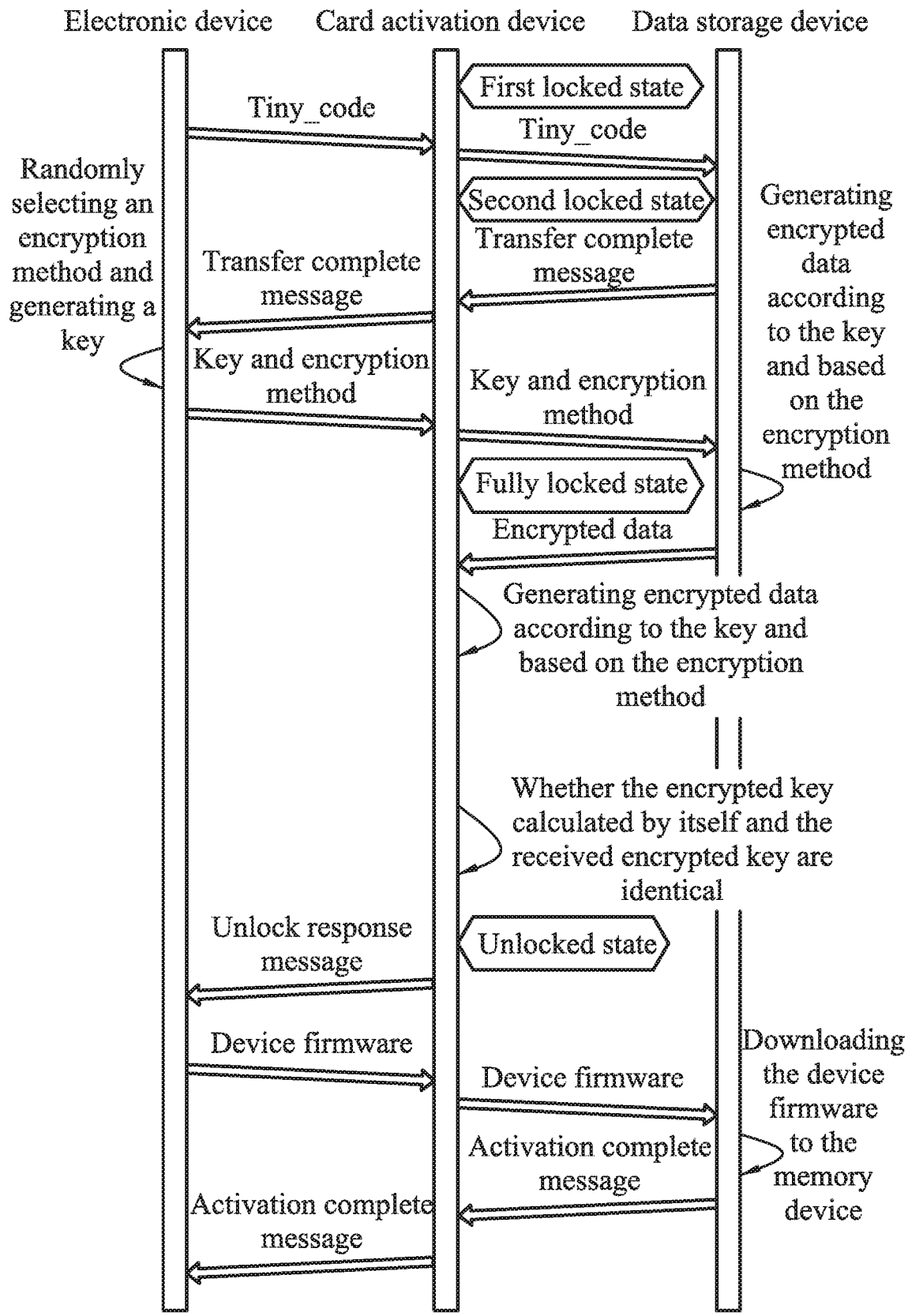
FIG. 5 is a schematic diagram showing an exemplary message flow of using the card activation device to authenticate and activate a data storage device according to the first embodiment of the invention.

FIG. 5 is a schematic diagram showing an exemplary message flow of using the card activation device to authenticate and activate a data storage device according to the first embodiment of the invention. In FIG. 5, the message flow among the electronic device (or, the processor 140 thereof, which is also applied hereinafter), the card activation device 200/host device 130 (or, the central control unit 21A thereof, which is also applied hereinafter) and the data storage device 100 (or, the memory controller 110 thereof, which is also applied hereinafter) is shown.

According to an embodiment of the invention, after the card activation device 200 is powered up, a first locked state of the card activation device 200 is entered. Before being successfully unlocked, the card activation device 200 is allowed to perform data transfer for transmitting data to the data storage device 100 a first predetermined number of times at most. In addition, in the first locked state, the amount of data that can be transferred to the data storage device 100 in each data transfer is also limited to a predetermined amount.

According to an embodiment of the invention, in the first locked state, the card activation device 200 is allowed to perform data transfer for transmitting data to the data storage device 100 two times at most, and the amount of data that can be transferred from the card activation device 200 to data storage device 100 in the first data transfer may be limited to, for example, 64 KB.

As shown in FIG. 5, after the card activation device 200 is powered up, the electronic device is configured to transmit the first control command and the first authentication data to the card activation device 200. In the embodiments of the invention, the first authentication data may comprise the program code Tiny_code which is utilized to generate encrypted data (for example, the encrypted key). The card activation device 200 is then configured to transmit the first authentication data comprising the program code Tiny_code to the data storage device 100 in response to the first control command.

After the first authentication data is transmitted to the data storage device 100, a second locked state of the card activation device 200 is entered. According to an embodiment of the invention, in the second locked state, the card activation device 200 is only allowed to perform data transfer for transmitting data to the data storage device 100 a second predetermined number of times at most. In addition, in the second locked state, the amount of data that can be transferred to the data storage device 100 in each data transfer is also limited to a predetermined amount. The second predetermined number may be lower than the first predetermined number. For example, in the second locked state, the card activation device 200 is allowed to perform data transfer for transmitting data to the data storage device 100 once at most, and the amount of data that can be transferred by the card activation device 200 to the data storage device 100 in this data transfer may be limited to, for example, 64 KB.

Upon receiving the first authentication data comprising the program code Tiny_code, the data storage device 100 may respond to the card activation device 200 by sending a transfer complete message to the card activation device 200, and the card activation device 200 may further send the transfer complete message to the electronic device. According to an embodiment of the invention, the data storage device 100 may store the received first authentication data in the buffer memory 116 thereof for executing the program code Tiny_code. Note that in an embodiment of the invention, the data storage device 100 may not further download the program code Tiny_code into the memory device 120 of the data storage device 100.

According to an embodiment of the invention, the program code Tiny_code may comprise a predetermined amount of encryption and decryption codes and a predetermined amount of dummy data. That is, in the embodiments of the invention, the genuine encryption/decryption codes are embedded in the program code Tiny_code and the content of the program code Tiny_code is disturbed or scrambled by the dummy data. By executing the built-in firmware code which has already been stored in the corresponding ROM 112M, the memory controller 110 of the data storage device 100 may parse the program code Tiny_code and extract the genuine encryption/decryption codes that it needs and store the extracted encryption/decryption codes in the buffer memory 116 for further execution.

According to the first embodiment of the invention, upon receiving the transfer complete message, the electronic device may randomly select an encryption method and generate a key. The electronic device may transmit the key and information regarding the selected encryption method as the second authentication data to the card activation device 200. The card activation device 200 is then configured to transmit the second authentication data comprising the key and information regarding the selected encryption method to the data storage device 100 in response to the corresponding control command issued by the electronic device.

After the second authentication data has been transmitted to the data storage device 100, a third locked state, which is a fully locked state, of the card activation device 200 is entered. In the fully locked state, the card activation device 200 is not allowed to further transmit any data to the data storage device 100. That is, no more command and data transfer from the card activation device 200 to the data storage device 100 is allowed.

Upon receiving the key and information regarding the selected encryption method, the data storage device 100 is configured to execute the program code Tiny_code to generate encrypted data according to the key and based on the encryption method. As discussed above, the memory controller 110 of the data storage device 100 may parse the program code Tiny_code and extract the genuine encryption/decryption codes that it needs based on the encryption method indicated by the electronic device.

In an embodiment of the invention, the data storage device 100 is configured to calculate the encrypted key as encrypted data, and then configured to transmit the encrypted data to the card activation device 200.

According to another embodiment of the invention, the data storage device 100 is configured to randomly generate a massive amount of dummy data, calculate the encrypted key, and embed the encrypted key in the dummy data based on the encryption method as encrypted data. The data storage device 100 is then configured to transmit the encrypted data to the card activation device 200.

Upon receiving the encrypted data, the card activation device 200 is configured to compare the encrypted key calculated by itself with the encrypted key received from the data storage device 100 and determine whether they are identical, so as to verify the integrity of the data storage device (that is, whether the data storage device is an authorized device). In some embodiment where the encrypted key is embedded in the dummy data as the encrypted data, the card activation device 200 is further configured to use the encryption method to find out the location of the valid data (that is, the encrypted key) embedded in the dummy data, so as to find out the encrypted key transmitted by the data storage device 100. After finding out the encrypted key, the card activation device 200 is then configured to compare the encrypted key calculated by itself with the encrypted key received from the data storage device 100 and determine whether they are identical, so as to verify the integrity of the data storage device.

In an embodiment of the invention, the card activation device 200 may execute the program code Tiny_code to generate (calculate) encrypted key according to the key and based on the encryption method. In another embodiment of the invention, the card activation device 200 may execute the codes stored in the memory device 230 to generate (calculate) encrypted key according to the key and based on the encryption method.

If the encrypted key calculated by the card activation device 200 is not a match with the encrypted key received from the data storage device 100, the card activation device 200 is kept locked and operates in the fully locked state.

If the encrypted key calculated by the card activation device matches the encrypted key received from the data storage device 100, it means that the data storage device 100 has passed the authentication procedure. Upon determining that data storage device 100 has passed the authentication procedure, the card activation device 200 is unlocked and operates in the unlocked state. The card activation device 200 may then transmit an unlock response message to the electronic device.

In response to the unlock response message, the electronic device may determine that the data storage device 100 has passed the authentication procedure and may start the card-activation procedure by transmitting the corresponding device firmware required for activating the data storage device 100 to the card activation device 200. The card activation device 200 may then transmit the device firmware to the data storage device 100. The device firmware may be finally downloaded to the memory device 120 of the data storage device 100 under the control of the memory controller 110. When the device firmware is downloaded successfully, the activation procedure is completed and the data storage device 100 may transmit an activation complete message to the card activation device 200.

When the card activation device 200 receives the activation complete message, the card activation device 200 may further transmit an activation complete message to the electronic device. When the electronic device receives the activation complete message, the electronic device may issue a command to shut down the card activation device 200 or shut down the corresponding circuit inside of the card activation device 200 for communicating with the data storage device 100. Then, after the card activation device 200 or the corresponding circuit is powered up again, the first locked state of the card activation device 200 will be entered, again, for performing the authentication procedure and the activation procedure for a next data storage device.

According to a second embodiment of the invention, the second authentication data may comprise an encrypted key and an encryption/decryption method corresponding to the encrypted key. The central control unit 21A may receive a key and an encryption method, selected by the processor 140, from the processor 140 and calculate an encrypted key based on the encryption method. The central control unit 21A may then transmit the encrypted key and the corresponding encryption/decryption method to the data storage device 100 as the second authentication data. The data storage device 100 has to decrypt the key based on the encrypted key and the corresponding encryption/decryption method and then transmit the decrypted key (that is, the above-mentioned authentication response data) to the card activation device 200. During the authentication procedure, the central control unit 21A is configured to compare whether the key received from the processor 140 and the decrypted key received from the data storage device 100 are identical, and when the keys are identical, the central control unit 21A determines that the data storage device has passed the authentication procedure.

Figure 6:
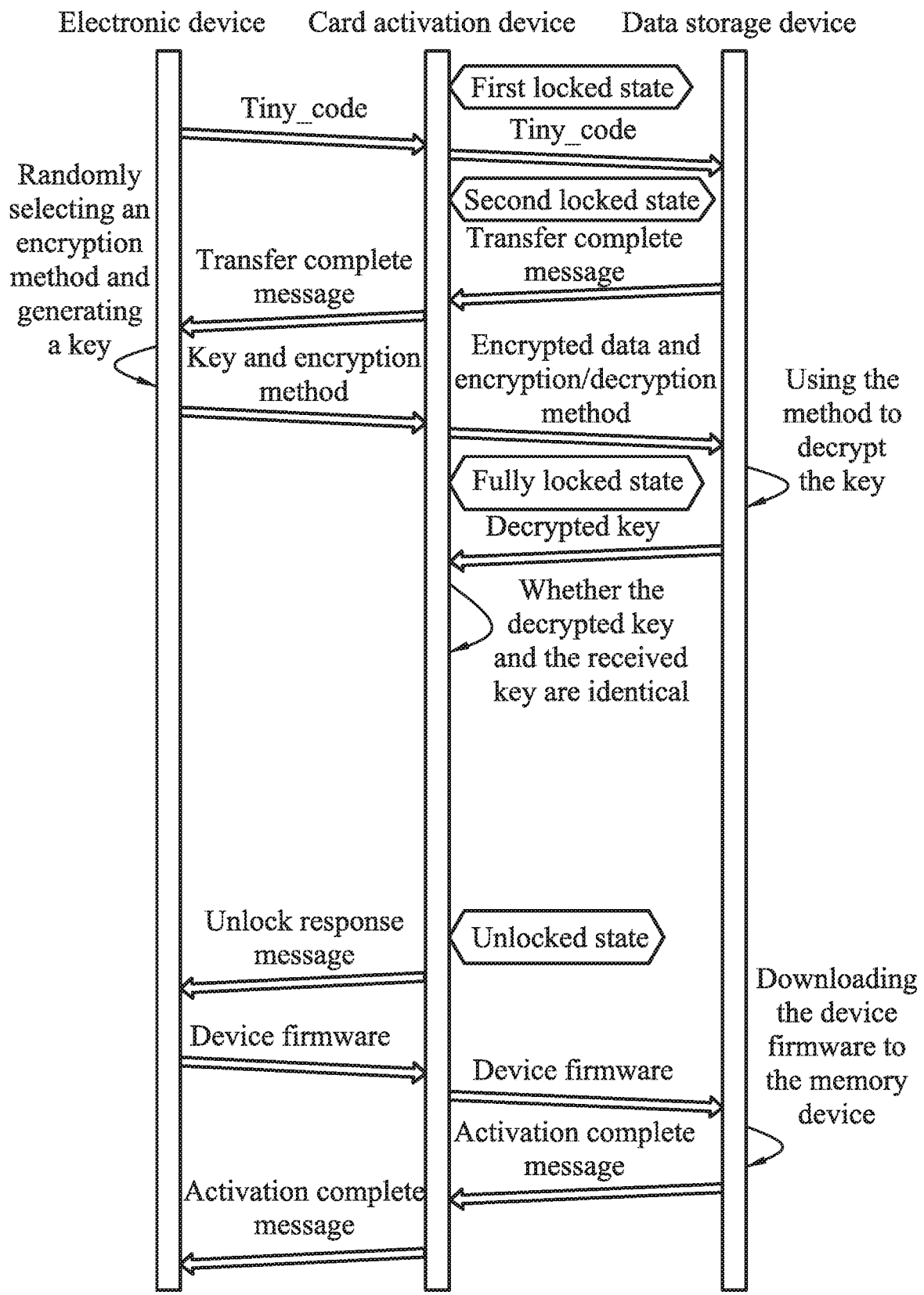
FIG. 6 is a schematic diagram showing an exemplary message flow of using the card activation device to authenticate and activate a data storage device according to the second embodiment of the invention.

FIG. 6 is a schematic diagram showing an exemplary message flow of using the card activation device to authenticate and activate a data storage device according to the second embodiment of the invention. In FIG. 6, the message flow among the electronic device (or, the processor 140 thereof, which is also applied hereinafter), the card activation device 200/host device 130 (or, the central control unit 21A thereof, which is also applied hereinafter) and the data storage device 100 (or, the memory controller 110 thereof, which is also applied hereinafter) is shown.

Similar to the first embodiment, after the card activation device 200 is powered up, the first locked state of the card activation device 200 is entered. Before being successfully unlocked, the card activation device 200 is allowed to perform data transfer for transmitting data to the data storage device 100 a first predetermined number of times at most. In addition, in the first locked state, the amount of data that can be transferred to the data storage device 100 in each data transfer is also limited to a predetermined amount.

According to an embodiment of the invention, in the first locked state, the card activation device 200 is allowed to perform data transfer for transmitting data to the data storage device 100 two times at most, and the amount of data that can be transferred from the card activation device 200 to data storage device 100 in the first data transfer may be limited to, for example, 64 KB.

As shown in FIG. 6, after the card activation device 200 is powered up, the electronic device is configured to transmit the first control command and the first authentication data to the card activation device 200. In the embodiments of the invention, the first authentication data may comprise the program code Tiny_code which is utilized to generate encrypted data (for example, the encrypted key). The card activation device 200 is then configured to transmit the first authentication data comprising the program code Tiny_code to the data storage device 100 in response to the first control command.

After the first authentication data is transmitted to the data storage device 100, a second locked state of the card activation device 200 is entered. According to an embodiment of the invention, in the second locked state, the card activation device 200 is only allowed to perform data transfer for transmitting data to the data storage device 100 a second predetermined number of times at most. In addition, in the second locked state, the amount of data that can be transferred to the data storage device 100 in each data transfer is also limited to a predetermined amount. The second predetermined number may be lower than the first predetermined number. For example, in the second locked state, the card activation device 200 is allowed to perform data transfer for transmitting data to the data storage device 100 once at most, and the amount of data that can be transferred by the card activation device 200 to the data storage device 100 in this data transfer may be limited to, for example, 64 KB.

Upon receiving the first authentication data comprising the program code Tiny_code, the data storage device 100 may respond to the card activation device 200 by sending a transfer complete message to the card activation device 200, and the card activation device 200 may further send the transfer complete message to the electronic device. According to an embodiment of the invention, the data storage device 100 may store the received first authentication data in the buffer memory 116 thereof for executing the program code Tiny_code. Note that in an embodiment of the invention, the data storage device 100 may not further download the program code Tiny_code into the memory device 120 of the data storage device 100.

According to the second embodiment of the invention, upon receiving the transfer complete message, the electronic device may randomly select an encryption method and generate a key. The electronic device may transmit the key and information regarding the selected encryption method to the card activation device 200. In an embodiment of the invention, the card activation device 200 may then execute the program code Tiny_code or execute the codes stored in the memory device 230 to generate encrypted data according to the key and based on the encryption method. According to another embodiment of the invention, the card activation device 200 is configured to randomly generate a massive amount of dummy data, calculate the encrypted key, and embed the encrypted key in the dummy data based on the encryption method as encrypted data.

In one embodiment of the invention, the card activation device 200 is then configured to transmit the encrypted data and information regarding the selected encryption method to the data storage device 100.

In another embodiment of the invention, the card activation device 200 is then configured to transmit the encrypted data and information regarding the decryption method to the data storage device 100. In this embodiment, there may be a mapping table, which describes the mapping relationship between the encryption codes of the corresponding encryption methods and the decryption codes of the corresponding decryption methods, stored in the ROM 214 or the memory device 230. Therefore, in this embodiment of the invention, upon receiving information regarding the selected encryption method, the card activation device 200 may look up the mapping table to know which decryption method is mapped to the encryption method selected by the electronic device, and then transmit the encrypted data and information regarding the decryption method to the data storage device 100.

In one embodiment of the invention, upon receiving the encrypted data and information regarding the selected encryption method, the data storage device 100 is configured to execute the program code Tiny_code, so as to use the encryption method or decryption method to find out the location of the valid data (that is, the encrypted key) embedded in the dummy data, and to find out the encrypted key transmitted by the card activation device 200. After finding out the encrypted key, the data storage device 100 is further configured to decrypt the key. To be more specific, in this embodiment, there may be a mapping table, which describes the mapping relationship between the encryption codes of the corresponding encryption methods and the decryption codes of the corresponding decryption methods, recorded in the program code Tiny_code. Upon receiving information regarding the encryption method selected the electronic device, the data storage device 100 may look up the mapping table recorded in the program code Tiny_code to know which decryption method is mapped to the selected encryption method, and then obtain the corresponding decryption codes. The data storage device 100 is further configured to decrypt the key by executing the decryption codes. After decryption, the data storage device 100 is configured to transmit the decrypted key to the card activation device 200.

In another embodiments of the invention in which the card activation device 200 transmits the encrypted data and information regarding the decryption method to the data storage device 100, upon receiving the encrypted data and information regarding the decryption method, the data storage device 100 is configured to execute the program code Tiny_code to use the encryption method to find out the location of the valid data (that is, the encrypted key) embedded in the dummy data, so as to find out the encrypted key transmitted by the card activation device 200. After finding out the encrypted key, the data storage device 100 is then configured to decrypt the key by executing the decryption codes obtained based on the received information regarding the decryption method. After decryption, the data storage device 100 is configured to transmit the decrypted key to the card activation device 200.

Upon receiving the decrypted key, the card activation device 200 is configured to compare the decrypted key with the key received from the electronic device and determine whether they are identical, so as to verify the integrity of the data storage device (that is, whether the data storage device is an authorized device).

If the decrypted key calculated by the data storage device 100 is not a match with the key received from the electronic device, the card activation device 200 is kept locked and operates in the fully locked state.

If the encrypted key calculated by the data storage device 100 matches the encrypted key received from the electronic device, it means that the data storage device 100 has passed the authentication procedure. Upon determining that data storage device 100 has passed the authentication procedure, the card activation device 200 is unlocked and operates in the unlocked state. The card activation device 200 may then transmit an unlock response message to the electronic device.

In response to the unlock response message, the electronic device may determine that the data storage device 100 has passed the authentication procedure and may start the card-activation procedure by transmitting the corresponding device firmware required for activating the data storage device 100 to the card activation device 200. The card activation device 200 may then transmit the device firmware to the data storage device 100. The device firmware may be finally downloaded to the memory device 120 of the data storage device 100 under the control of the memory controller 110. When the device firmware is downloaded successfully, the activation procedure is completed and the data storage device 100 may transmit an activation complete message to the card activation device 200.

When the card activation device 200 receives the activation complete message, the card activation device 200 may further transmit the activation complete message to the electronic device. When the electronic device receives the activation complete message, the electronic device may issue a command to shut down the card activation device 200 or shut down the corresponding circuit inside of the card activation device 200 for communicating with the data storage device 100. Then, after the card activation device 200 or the corresponding circuit is powered up again, the first locked state of the card activation device 200 will be entered, again, for performing the authentication procedure and the activation procedure for a next data storage device.

According to a third embodiment of the invention, the second authentication data may comprise an encrypted key and an encryption/decryption method corresponding to the encrypted key. The central control unit 21A may receive a key which is generated by the processor 140 from the processor 140, select an encryption method by itself, and calculate an encrypted key based on the selected encryption method. The central control unit 21A may then transmit the encrypted key and the corresponding encryption method or decryption method to the data storage device 100 as the second authentication data. The data storage device 100 has to decrypt the key based on the encrypted key and the corresponding encryption method or decryption method and then transmit the decrypted key (that is, the above-mentioned authentication response data) to the card activation device 200.

During the authentication procedure, the central control unit 21A is configured to compare whether the key received from the processor 140 and the decrypted key received from the data storage device 100 are identical, and when the keys are identical, the central control unit 21A determines that the data storage device has passed the authentication procedure.

Figure 7:
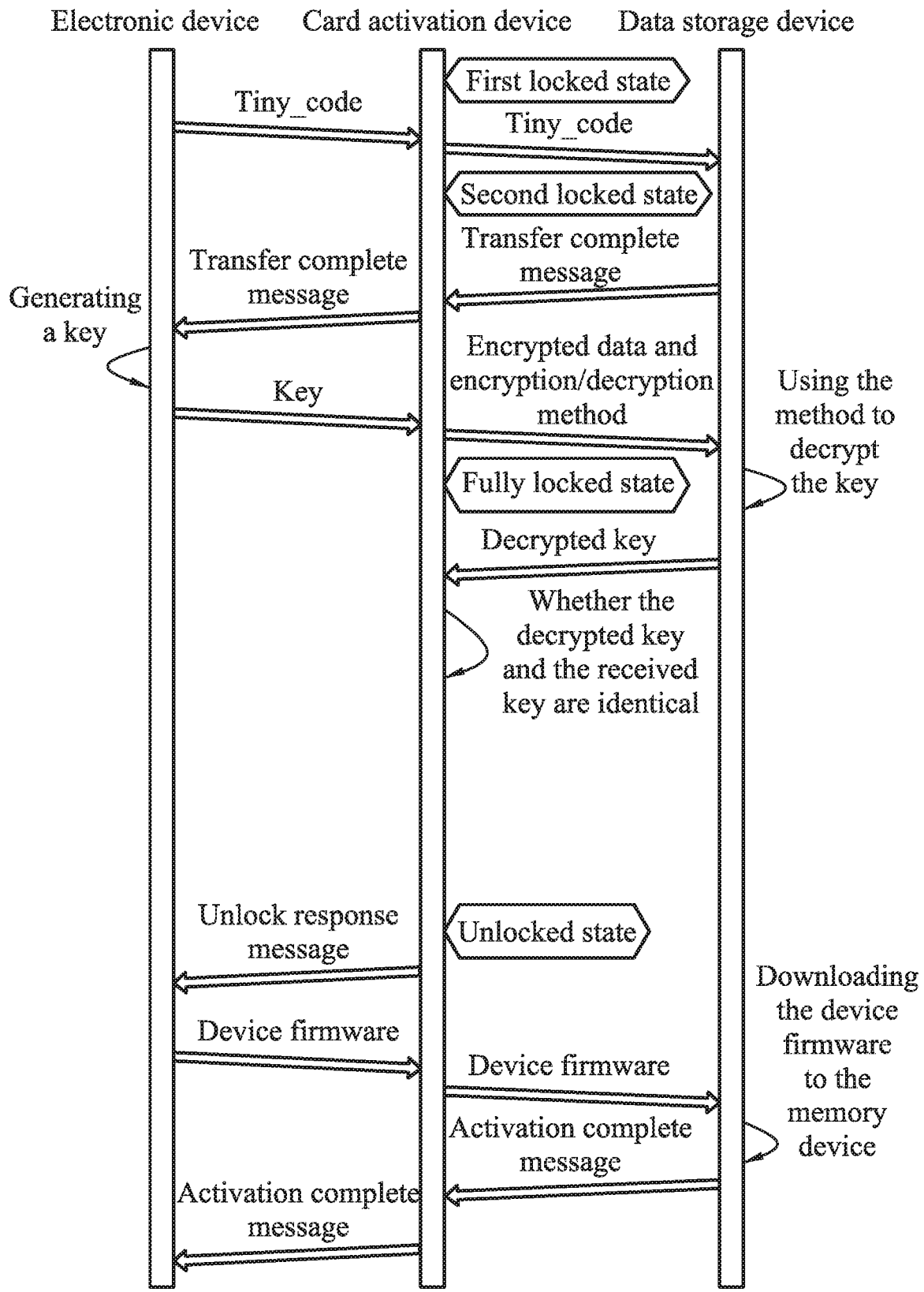
FIG. 7 is a schematic diagram showing an exemplary message flow of using the card activation device to authenticate and activate a data storage device according to the third embodiment of the invention.

FIG. 7 is a schematic diagram showing an exemplary message flow of using the card activation device to authenticate and activate a data storage device according to the third embodiment of the invention. In FIG. 7, the message flow among the electronic device (or, the processor 140 thereof, which is also applied hereinafter), the card activation device 200/host device 130 (or, the central control unit 21A thereof, which is also applied hereinafter) and the data storage device 100 (or, the memory controller 110 thereof, which is also applied hereinafter) is shown.

Similar to the first embodiment, after the card activation device 200 is powered up, the first locked state of the card activation device 200 is entered. Before being successfully unlocked, the card activation device 200 is allowed to perform data transfer for transmitting data to the data storage device 100 a first predetermined number of times at most. In addition, in the first locked state, the amount of data that can be transferred to the data storage device 100 in each data transfer is also limited to a predetermined amount.

According to an embodiment of the invention, in the first locked state, the card activation device 200 is allowed to perform data transfer for transmitting data to the data storage device 100 two times at most, and the amount of data that can be transferred from the card activation device 200 to data storage device 100 in the first data transfer may be limited to, for example, 64 KB.

As shown in FIG. 7, after the card activation device 200 is powered up, the electronic device is configured to transmit the first control command and the first authentication data to the card activation device 200. In the embodiments of the invention, the first authentication data may comprise the program code Tiny_code which is utilized to generate encrypted data (for example, the encrypted key). The card activation device 200 is then configured to transmit the first authentication data comprising the program code Tiny_code to the data storage device 100 in response to the first control command.

After the first authentication data is transmitted to the data storage device 100, a second locked state of the card activation device 200 is entered. According to an embodiment of the invention, in the second locked state, the card activation device 200 is only allowed to perform data transfer for transmitting data to the data storage device 100 a second predetermined number of times at most. In addition, in the second locked state, the amount of data that can be transferred to the data storage device 100 in each data transfer is also limited to a predetermined amount. The second predetermined number may be lower than the first predetermined number. For example, in the second locked state, the card activation device 200 is allowed to perform data transfer for transmitting data to the data storage device 100 once at most, and the amount of data that can be transferred by the card activation device 200 to the data storage device 100 in this data transfer may be limited to, for example, 64 KB.

Upon receiving the first authentication data comprising the program code Tiny_code, the data storage device 100 may respond to the card activation device 200 by sending a transfer complete message to the card activation device 200, and the card activation device 200 may further send the transfer complete message to the electronic device.

According to the third embodiment of the invention, upon receiving the transfer complete message, the electronic device may generate a key. The electronic device may transmit the key to the card activation device 200. According to the third embodiment of the invention, the card activation device 200 may randomly select an encryption method for encrypting this key, and may execute the program code Tiny_code or the program code stored in the memory device 230 to generate encrypted data according to the key and based on the encryption method. In an embodiment of the invention, the card activation device 200 may generate the encrypted key as the encrypted data, and transmit the encrypted data and information regarding the encryption method or decryption method to the data storage device 100. In another embodiment of the invention, the card activation device 200 may be configured to randomly generate a massive amount of dummy data, generate the encrypted key, and embed the encrypted key in the dummy data based on the encryption method as encrypted data. The card activation device 200 may then transmit the encrypted data and information regarding the encryption method or decryption method to the data storage device 100.

Upon receiving the encrypted data and information regarding the encryption method or decryption method, the data storage device 100 is configured to execute the program code Tiny_code to use the encryption method or the decryption method to find out the location of the valid data (that is, the encrypted key) embedded in the dummy data, so as to find out the encrypted key transmitted by the card activation device 200. After finding out the encrypted key, the data storage device 100 is then configured to decrypt the key by executing the decryption codes obtained based on the received information regarding the encryption method or the decryption method. After decryption, the data storage device 100 is configured to transmit the decrypted key to the card activation device 200.

Upon receiving the decrypted key, the card activation device 200 is configured to compare the decrypted key with the key received from the electronic device and determine whether they are identical, so as to verify the integrity of the data storage device (that is, whether the data storage device is an authorized device).

If the decrypted key calculated by the data storage device 100 is not a match with the key received from the electronic device, the card activation device 200 is kept locked and operates in the fully locked state.

If the encrypted key calculated by the data storage device 100 matches the encrypted key received from the electronic device, it means that the data storage device 100 has passed the authentication procedure. Upon determining that data storage device 100 has passed the authentication procedure, the card activation device 200 is unlocked and operates in the unlocked state. The card activation device 200 may then transmit an unlock response message to the electronic device.

In response to the unlock response message, the electronic device may determine that the data storage device 100 has passed the authentication procedure and may start the card-activation procedure by transmitting the corresponding device firmware required for activating the data storage device 100 to the card activation device 200. The card activation device 200 may then transmit the device firmware to the data storage device 100. The device firmware may be finally downloaded to the memory device 120 of the data storage device 100 under the control of the memory controller 110. When the device firmware is downloaded successfully, the activation procedure is completed and the data storage device 100 may transmit an activation complete message to the card activation device 200.

When the card activation device 200 receives the activation complete message, the card activation device 200 may further transmit the activation complete message to the electronic device. When the electronic device receives the activation complete message, the electronic device may issue a command to shut down the card activation device 200 or shut down the corresponding circuit inside of the card activation device 200 for communicating with the data storage device 100. Then, after the card activation device 200 or the corresponding circuit is powered up again, the first locked state of the card activation device 200 will be entered, again, for performing the authentication procedure and the activation procedure for a next data storage device.

As discussed above, in the embodiments of the invention, before the card activation device performing the card-activation procedure for activating the data storage device, the card activation device may first authorize the data storage device so as to verify the integrity of the data storage device. Before determining that the data storage device has passed the authentication procedure, the card activation device is kept locked and operates in the fully locked state. In this manner, no further data transfer between the card activation device and the data storage device is allowed, such that the device firmware can be well protected and will not be downloaded to any unauthorized device or disallowed device. In other words, in the embodiments of the invention, the data storage device that cannot pass the proposed authentication procedure will not be activated by the proposed card activation device. Comparing to the conventional design, via the proposed method and card activation device, the data storage device can be activated more efficiently and more safely.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A card activation device for authenticating and activating a data storage device, comprising:
a first control unit, coupled to the data storage device through a first interface; and
a central control unit, coupled to the first control unit through a system bus,
wherein in response to a first control command received from an electronic device, the central control unit is configured to provide first authentication data to the first control unit through the system bus, and the first control unit is configured to transmit the first authentication data to the data storage device through the first interface,
wherein after the first authentication data is transmitted to the data storage device, the central control unit is configured to provide second authentication data to the first control unit through the system bus in response to a second control command received from the electronic device, and the first control unit is configured to transmit the second authentication data to the data storage device through the first interface, and
wherein after the second authentication data is transmitted to the data storage device, the central control unit controls the card activation device to enter a fully locked state, in the fully locked state, the central control unit is configured to perform an authentication procedure for authenticating the data storage device, and before the central control unit determines that the data storage device has passed the authentication procedure, the central control unit is not allowed to transmit any data to the data storage device.

2. The card activation device as claimed in claim 1, wherein after the card activation device is powered up, the central control unit controls the card activation device to enter a first locked state, and in the first locked state, the central control unit is allowed to perform at most a first predetermined number of data transfers for transmitting data to the data storage device.

3. The card activation device as claimed in claim 2, wherein after the first authentication data is transmitted to the data storage device, the central control unit controls the card activation device to enter a second locked state, and in the second locked state, the central control unit is allowed to perform at most a second predetermined number of data transfers for transmitting data to the data storage device.

4. The card activation device as claimed in claim 1, wherein when determining that the data storage device has passed the authentication procedure, the central control unit controls the card activation device to enter an unlocked state, wherein in the unlocked state, the central control unit is configured to provide device firmware received from the electronic device to the first control unit through the system bus in response to a third control command received from the electronic device, and the first control unit is configured to transmit the device firmware to the data storage device through the first interface, so as to activate the data storage device.

5. The card activation device as claimed in claim 1, wherein the first authentication data comprises a program code utilized for generating encrypted data.

6. The card activation device as claimed in claim 1, wherein the second authentication data comprises a key and an encryption method selected by the electronic device, and the central control unit is configured to receive the second authentication data from the electronic device, and wherein in the authentication procedure, the central control unit is further configured to use the key and the encryption method to calculate a first encrypted key, receive a second encrypted key from the data storage device and compare whether the first encrypted key and the second encrypted key are identical, and when the first encrypted key and the second encrypted key are identical, the central control unit determines that the data storage device has passed the authentication procedure.

7. The card activation device as claimed in claim 1, wherein the second authentication data comprises an encrypted key and an encryption/decryption method corresponding to the encrypted key, and in the authentication procedure, the central control unit is further configured to receive a decrypted key from the data storage device and compare whether a key received from the electronic device and the decrypted key received from the data storage device are identical, and when the key and the decrypted key are identical, the central control unit determines that the data storage device has passed the authentication procedure.

8. The card activation device as claimed in claim 1, wherein the first interface is a UFS interface.

9. A method of using a card activation device to authenticate and activate a data storage device, comprising:
transmitting, by the card activation device, first authentication data to the data storage device in response to a first control command received from an electronic device;
after the first authentication data is transmitted to the data storage device, transmitting, by the card activation device, second authentication data to the data storage device in response to a second control command received from the electronic device;
after the second authentication data is transmitted to the data storage device, controlling the card activation device to enter a fully locked state, wherein in the fully locked state and before the card activation device determines data transfer between the card activation device and the data storage device is allowed;

performing the authentication procedure for authenticating the data storage device and determining whether the data storage device has passed the authentication procedure by the card activation device;

controlling the card activation device to enter an unlocked state when determining that the data storage device has passed the authentication procedure; and in the unlocked state, receiving, by the card activation device, a third control command and a device firmware of the data storage device from the electronic device, and transmitting the device firmware to the data storage device in response to the third control command, so as to activate the data storage device.

10. The method as claimed in claim 9, further comprising:

after the card activation device is powered up, controlling the card activation device to enter a first locked state, wherein in the first locked state, the card activation device is allowed to perform at most a first predetermined number of data transfers for transmitting data to the data storage device.

11. The method as claimed in claim 10, further comprising:

after the first authentication data is transmitted to the data storage device, controlling the card activation device to enter a second locked state, wherein in the second locked state, the card activation device is allowed to perform at most a second predetermined number of data transfers for transmitting data to the data storage device.

12. The method as claimed in claim 9, wherein the first authentication data comprises a program code utilized for generating encrypted data.

13. The method as claimed in claim 9, wherein the second authentication data comprises a key and an encryption method selected by the electronic device, and wherein the step of performing the authentication procedure for authenticating the data storage device and determining whether the data storage device has passed the authentication procedure by the card activation device further comprises:

using the key and the encryption method to calculate a first encrypted key;

receiving a second encrypted key from the data storage device;

comparing whether the first encrypted key and the second encrypted key are identical; and determining that the data storage device has passed the authentication procedure when the first encrypted key and the second encrypted key are identical.

14. The method as claimed in claim 9, wherein the second authentication data comprises an encrypted key and an encryption/decryption method corresponding to the encrypted key, and wherein the step of performing the authentication procedure of the data storage device and determining whether the data storage device has passed the authentication procedure by the card activation device further comprises:

receiving a decrypted key from the data storage device;

comparing whether a key received from the electronic device and the decrypted key received from the data storage device are identical; and determining that the data storage device has passed the authentication procedure when the key and the decrypted key are identical.

15. The method as claimed in claim 9, wherein the data storage device is a UFS device.

* * * * *